(12) United States Patent
Xiong et al.

(10) Patent No.: US 10,747,494 B2
(45) Date of Patent: Aug. 18, 2020

(54) ROBOT AND SPEECH INTERACTION RECOGNITION RATE IMPROVEMENT CIRCUIT AND METHOD THEREOF

(71) Applicant: UBTECH Robotics Corp, Shenzhen (CN)

(72) Inventors: Youjun Xiong, Shenzhen (CN); Liyang Li, Shenzhen (CN); Yanhui Xia, Shenzhen (CN); Haoming Li, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 197 days.

(21) Appl. No.: 16/163,582

(22) Filed: Oct. 18, 2018

(65) Prior Publication Data

US 2019/0361664 A1 Nov. 28, 2019

(30) Foreign Application Priority Data

May 25, 2018 (CN) .......................... 2018 1 0514764

(51) Int. Cl.
*G10L 21/00* (2013.01)
*G06F 3/16* (2006.01)
*G10L 15/22* (2006.01)
*G10L 19/00* (2013.01)
*B25J 11/00* (2006.01)

(52) U.S. Cl.
CPC .............. *G06F 3/165* (2013.01); *G10L 15/22* (2013.01); *G10L 19/00* (2013.01); *B25J 11/0005* (2013.01)

(58) Field of Classification Search
CPC ...................................................... G10L 21/00
USPC ........ 704/258, 251, 270, 235, 272; 701/408; 700/94, 257; 386/337
See application file for complete search history.

(56) References Cited

U.S. PATENT DOCUMENTS

| | | | | |
|---|---|---|---|---|
| 5,065,389 A | * | 11/1991 | Roth | G11B 20/1876 369/47.18 |
| 5,130,816 A | * | 7/1992 | Yoshio | G11B 20/10527 369/47.16 |
| 6,947,893 B1 | * | 9/2005 | Iwaki | G01C 21/3629 701/441 |
| 9,878,664 B2 | * | 1/2018 | Kentley-Klay | G10K 11/346 |
| 2007/0260394 A1 | * | 11/2007 | Dean | G01C 21/00 701/408 |
| 2008/0071540 A1 | * | 3/2008 | Nakano | G10L 15/20 704/251 |

(Continued)

*Primary Examiner* — Michael Colucci

(57) ABSTRACT

The present disclosure provides a robot and speech interaction recognition rate improvement circuit and method thereof. In the circuit, the main controller transmits a pre-recorded servo sound file to the first decoder in response to detecting the robot being in a motion state; the first decoder decodes the servo sound file to obtain a first sound analog signal of a servo sound; the analog-to-digital converter converts the first sound analog signal of the servo sound into a first sound digital signal, and converts a second sound analog signal collected by the microphone into a second sound digital signal; and the main controller further performs a suppression process on the servo sound in the second sound digital signal based on the first sound digital signal and the second sound digital signal. As a result, the influence of the sound of the servo of the robot is effectively reduced.

9 Claims, 4 Drawing Sheets

Obtain a pre-recorded servo sound file of a servo of the robot to decode into a first sound analog signal and convert the first sound analog signal into a first sound digital signal, if the robot is detected to be in a motion state — S201

Convert a second sound analog signal collected by a microphone into a second sound digital signal — S202

Perform a suppression process on a servo sound in the second sound digital signal based on the first sound digital signal and the second sound digital signal — S203

(56) References Cited

U.S. PATENT DOCUMENTS

| | | | |
|---|---|---|---|
| 2009/0240356 A1* | 9/2009 | Goda | G11B 27/005 |
| | | | 700/94 |
| 2015/0217449 A1* | 8/2015 | Meier | B25J 9/1602 |
| | | | 700/257 |
| 2017/0055100 A1* | 2/2017 | Wong | H04S 7/301 |
| 2018/0376243 A1* | 12/2018 | Nagel | H04R 1/028 |
| 2019/0077007 A1* | 3/2019 | Mallinson | G16H 20/30 |

* cited by examiner

ROBOT AND SPEECH INTERACTION RECOGNITION RATE IMPROVEMENT CIRCUIT AND METHOD THEREOF

CROSS REFERENCE TO RELATED APPLICATIONS

This application claims priority to Chinese Patent Application No. 201810514764.0, filed May 25, 2018, which is hereby incorporated by reference herein as if set forth in its entirety.

BACKGROUND

1. Technical Field

The present disclosure relates to robot technology, and particularly to a robot and speech interaction recognition rate improvement circuit and method thereof.

2. Description of Related Art

As a unique ability of human beings, speech is an important means and channel for communicating between humans and accessing external information resources, and is of great significance to the development of human civilization. As an important component of human-computer interaction branch, speech recognition technology is an important interface for human-computer interaction, which has important and practical significance for the development of artificial intelligence. After decades of development, speech recognition technology has made remarkable progress and began to appear in the market gradually in addition to the laboratory. At present, speech recognition systems for a specific speaker already have high recognition accuracy and are widely used in industries such as industry, home appliances, communications, automotive electronics, medical, home services and consumer electronics.

At present, most of the existing speech interaction products are based on dedicated speech recognition chips, which sample and encode the sound signal input through the microphone and match the sound signal with the previously recorded voice information through the internal main controller, and then output the corresponding voice information via an eternal speaker through the on-chip module.

However, if a robot is in motion, since the servo of the robot itself will make sounds, the voice collected during the motion of the robot will contain a lot of noises generated by the motion of the servo, which affects the recognition rate of the speech interaction between the user and the robot.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

Figure 1:
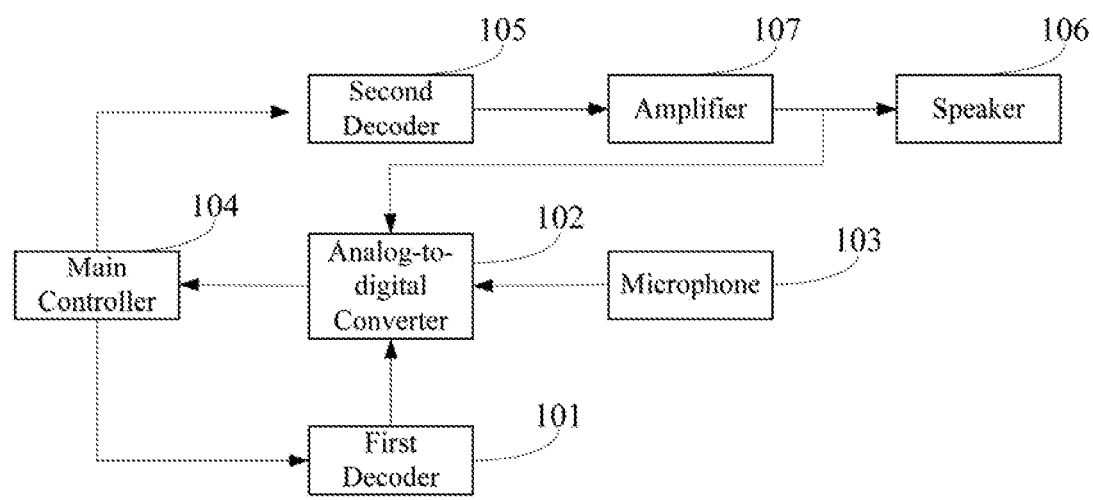
FIG. 1 is a schematic block diagram of an embodiment of a circuit for improving speech interaction recognition rate of a robot according to the present disclosure.

FIG. 1 is a schematic block diagram of an embodiment of a circuit for improving speech interaction recognition rate of a robot according to the present disclosure. The circuit can be applied to a robot.

As shown in FIG. 1, the circuit includes a first decoder 101, an analog-to-digital converter 102, a microphone 103, and a main controller 104, in which:

the main controller 104 is configured to transmit a pre-recorded servo sound file of a servo of the robot to the first decoder 101 in response to detecting the robot being in a motion state;

the first decoder 101 is configured to decode the servo sound file to obtain a first sound analog signal of a servo sound;

the analog-to-digital converter 102 is configured to convert the first sound analog signal of the servo sound transmitted by the first decoder 101 into a first sound digital signal, and convert a second sound analog signal collected by the microphone 103 into a second sound digital signal; and the main controller 104 is further configured to perform a suppression process on the servo sound in the second sound digital signal based on the first sound digital signal and the second sound digital signal.

The main controller 104 can be connected to the first decoder 101 and the analog-to-digital converter 102, and the microphone 103 is connected to the analog-to-digital converter 102. The main controller 104 can transmit a motion instruction that controls the servo of the robot, so that the robot can perform different motions. The servo of the robot may be electronically connected to the circuit in a direct or indirect manner, which may be used as a joint of the robot, so as to realize the movement of a limb of the robot which connected to the joint, and the robot can perform different motions. The movement of the servo specifically means the rotation of an output shaft of the servo.

The main controller 104 may read the pre-recorded servo sound file from a memory, and transmit the read file to the first decoder 101 to decode, so as to obtain the first sound analog signal corresponding to the servo sound file. The analog-to-digital converter 102 can convert the first sound analog signal into the first sound digital signal, and transmit the converted first sound digital signal to the main controller 104, so that the main controller 104 can perform the calculations for the subsequent sound suppression process.

The microphone 103 may be an array of microphones. After obtaining the ambient sounds through one or more microphones, the second sound analog signal of a second sound can be generated, and the second sound analog signal may be converted by the analog-to-digital converter 102 so as to obtain the second sound digital signal. When the robot is in the motion state, the second sound digital signal contains the sounds of the servo of the motion of the robot and the instruction sound of the user for the robot in the ambient. After the main controller 104 obtains the first sound digital signal and the second sound digital signal, the second sound digital signal may be suppressed according to the first sound digital signal, that is, eliminating the first sound digital signal contained in the second sound digital signal. The first sound digital signal may be subtracted from the second sound digital signal to obtain a sound signal after suppressing the sound of the servo of the robot, and other operations such as speech recognition can be performed on the suppressed sound signal, so as to improve the recognition accuracy of the speech instructions of the user.

In the present disclosure, the first decoding circuit 101, the analog-to-digital converter 102, and the main controller 104 may be integrated in a same chip, or the corresponding functions may be respectively implemented by different chips.

In addition, as shown in FIG. 1, in a preferred embodiment, the circuit for improving the speech interactive recognition rate of a robot further includes a second decoder 105 and a speaker 106. The second decoder 105 is connected to the main controller 104. When the robot needs to play the speech, a voice file is decoded by the second decoder 105 to obtain a third sound analog signal, and the third sound analog signal can be played by the speaker 106.

After decoding through the second decoder 105 to obtain the third sound analog signal, the analog-to-digital converter 102 can obtain the third sound analog signal and convert it into the third sound digital signal, then transmit it to the main controller 104. The main controller 104 can subtract the first sound digital signal and the third sound digital signal from the second sound signal, thereby obtaining a sound signal of the speech control instruction of the user, and further improving the accuracy of the speech recognition.

In addition, in a further optimized embodiment, the circuit for improving the speech interactive recognition rate of a robot further includes an amplifier 107. The amplifier 107 is configured to further amplify the voice signal that decoded by the second decoder 105, so that it meets the requirements for the speaker 106 to playback, and the amplified signal is transmitted to the analog-to-digital converter 102 to obtain an accurate value of the intensity of the voice signal played by the speaker 106, so as to perform a more accurate suppression on the voice played by the speaker 106.

Figure 2:
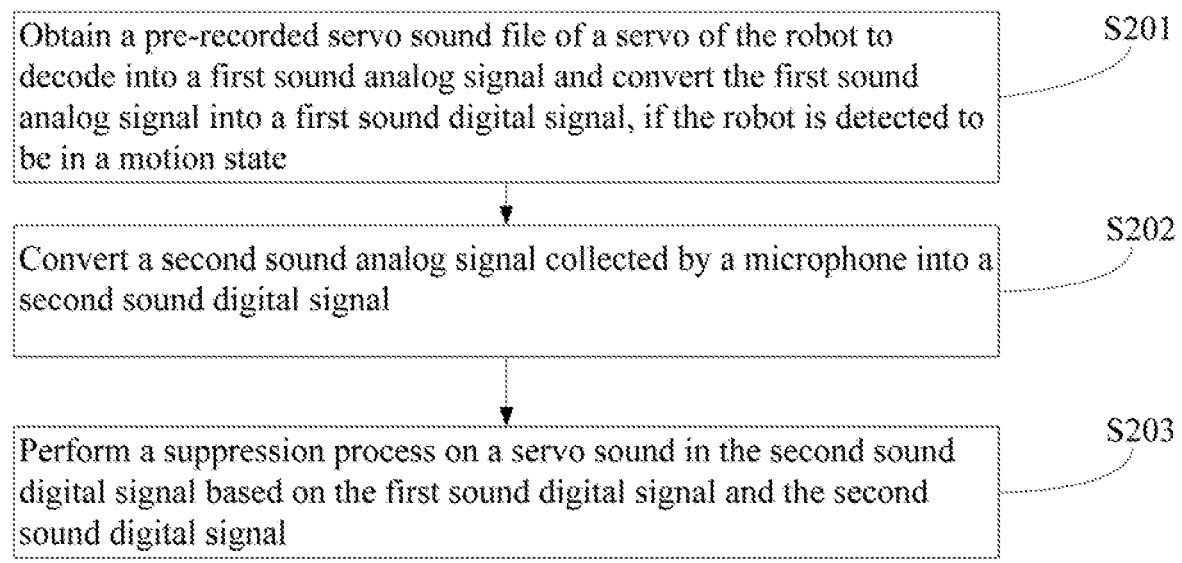
FIG. 2 is a flow chart of an embodiment of a method for improving speech interaction recognition rate of a robot according to the present disclosure.

FIG. 2 is a flow chart of an embodiment of a method for improving speech interaction recognition rate of a robot according to the present disclosure. The method can be applied to a robot. In one embodiment, the method is implemented by a device for improving speech interaction recognition rate of a robot, where the device includes a first sound signal obtaining unit, a second sound signal obtaining unit, a first suppression unit, a third sound signal obtaining unit, and a second suppression unit, while each of the above-mentioned units may be implemented in the form of hardware (e.g., a circuit), software (e.g., a program), or a combination thereof (e.g., a single chip microcomputer). As shown in FIG. 2, the method includes the following steps.

S201: obtaining a pre-recorded servo sound file of a servo of the robot to decode into a first sound analog signal and converting the first sound analog signal into a first sound digital signal, if the robot is detected to be in a motion state.

The servo of the robot may be electronically connected to the circuit in a direct or indirect manner, which may be used as a joint of the robot, so as to realize the movement of a limb of the robot which connected to the joint. The movement of the servo specifically means the rotation of an output shaft of the servo. The motion state of the robot refers to a motion such as walking, waving, and turning which is generated by the robot to control the rotation of the output shaft of the servo in response to receiving a control instruction.

It is detected that the robot is in the motion state, where it can determine whether the robot is in the motion state by detecting whether there is an instruction to control the output shaft of the servo of the robot to rotate. Through the detection of the servo control instruction, it is possible to more accurately detect and distinguish that the current motion state of the robot is the motion controlled by the servo in the robot.

The pre-recorded servo sound file includes a sound produced by controlling the output shaft of the sevro of the robot to rotate. The robot can be installed in an installation scene to avoid interference of the ambient sound, the microphone is installed at the position of the servo of the robot, and then the sound collected by the microphone when the robot is controlled to move (i.e., the output shaft of the servo of the robot is controlled to rotate) is the sound of the servo. The servo sound file may be pre-stored in a memory of the robot.

When detecting that the robot is in the motion state, that is, when the servo of the robot is moving (i.e., the output shaft of the servo is rotating), the pre-stored servo sound file of the robot can be read, and the servo sound file is decoded to obtain the analog signal corresponding to the sound of the servo, that is, the first sound analog signal. The first sound analog signal may be converted by a first decoder to obtain the first sound digital signal. The first sound digital signal is the digital signal of the sound of the servo of the robot.

In one embodiment, step S201 is implemented through the first sound signal obtaining unit of the device for improving speech interaction recognition rate of a robot, that is, the first sound signal obtaining unit is configured to obtain a pre-recorded servo sound file of a servo of the robot to decode into a first sound analog signal and converting the first sound analog signal into a first sound digital signal, if the robot is detected to be in a motion state.

S202: converting a second sound analog signal collected by a microphone into a second sound digital signal.

The microphone may be a microphone or a microphone array. The orientation of the second sound can be obtained while collecting the second sound through the microphone array, thereby facilitating the robot to perform corresponding operations according to the orientation of the second sound, for example, controlling the robot to face the source of the second sound.

When the second sound is obtained through the microphone, if the robot is in the motion state, there is the sound of the servo of the robot in addition to the ambient sound. The ambient sound may include the speech instructions of the user as well as the noises in the ambient. In addition, in order to improve the speech interactive recognition rate, the noise in the ambient can also be filtered. The low-frequency signal in the second sound digital signal may be filtered to effectively remove the noises in the ambient.

In one embodiment, step S202 is implemented through the second sound signal obtaining unit of the device for improving speech interaction recognition rate of a robot, that is, the second sound signal obtaining unit is configured to convert a second sound analog signal collected by a microphone into a second sound digital signal.

S203: performing a suppression process on a servo sound in the second sound digital signal based on the first sound digital signal and the second sound digital signal.

After obtaining the first sound digital signal and the second sound digital signal, the sounds contained in the first sound digital signal and the second sound digital signal are analyzed to find that the first sound digital signal is the digital signal corresponding to the sound of the servo of the robot, the second sound digital signal contains the sound a the servo of the robot and the speech of the control instruction issued by the user. Through removing the first sound digital signal contained in the second sound digital signal, for example, removing the sound content of the second sound digital signal in the sound content of the first sound digital signal, the sound after the suppression process can be obtained.

In one embodiment, step S203 is implemented through the first suppression unit of the device for improving speech interaction recognition rate of a robot, that is, the first suppression unit is configured to perform a suppression process on a servo sound in the second sound digital signal based on the first sound digital signal and the second sound digital signal.

In the present disclosure, the servo sound file of the robot is set in advance, the first sound digital signal corresponding to the preset servo sound file is obtained when detecting that the robot is in the motion state, and the suppression process is performed on the sound of the servo in the collected second sound digital signal according to the second sound digital signal in the ambient which is collected by the microphone, so that in the second sound digital signal after the suppression process, the influence of the sound of the servo of the robot is effectively reduced, and the recognition rate of the speech interaction of the robot is improved.

Figure 3:
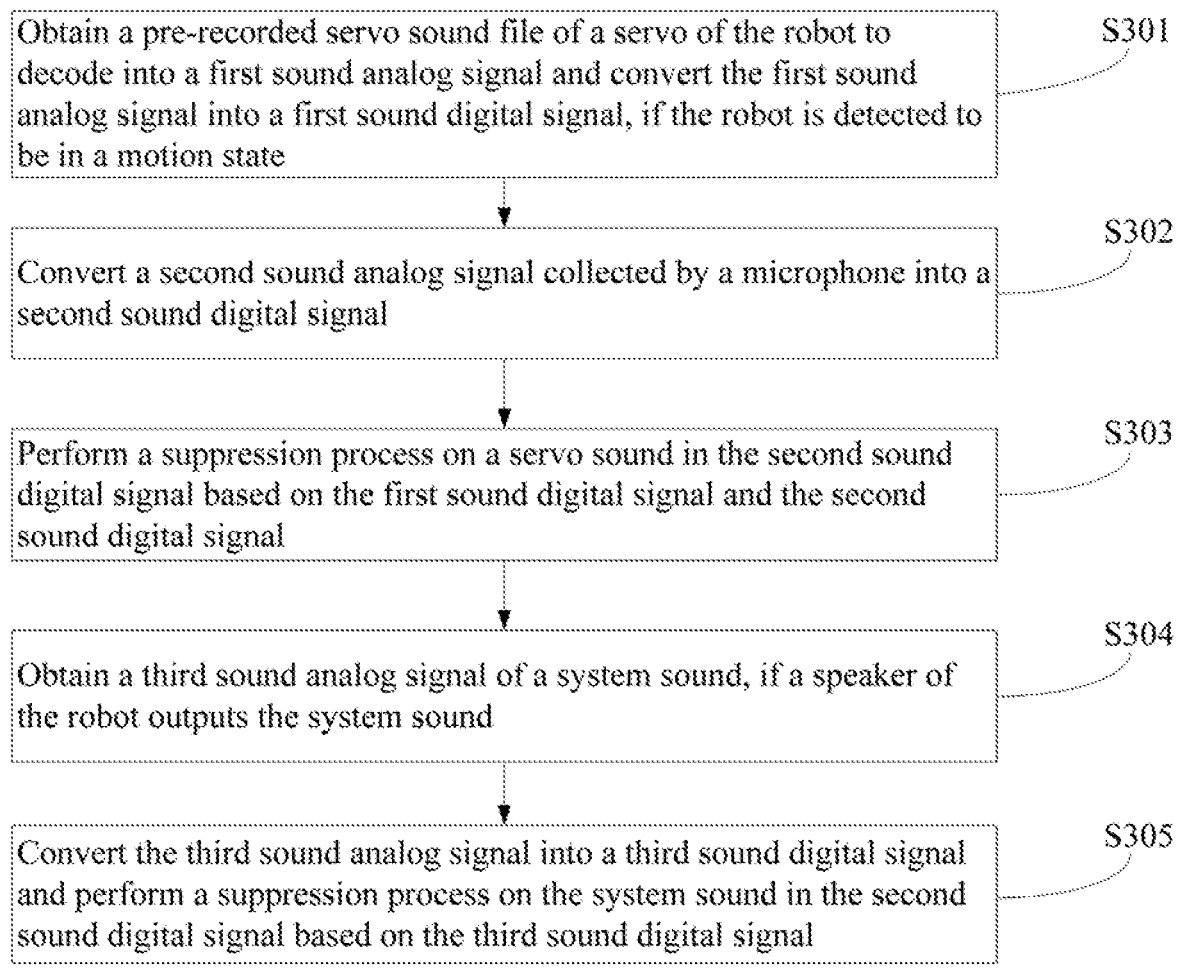
FIG. 3 is a flow chart of another embodiment of a method for improving speech interaction recognition rate of a robot according to the present disclosure.

FIG. 3 is a flow chart of another embodiment of a method for improving speech interaction recognition rate of a robot according to the present disclosure. In one embodiment, the method is implemented by the device for improving speech interaction recognition rate of a robot. As shown in FIG. 3, the method includes the following steps.

S301: obtaining a pre-recorded servo sound file of a servo of the robot to decode into a first sound analog signal and converting the first sound analog signal into a first sound digital signal, if the robot is detected to be in a motion state.

S302: converting a second sound analog signal collected by a microphone into a second sound digital signal.

S303: performing a suppression process on a servo sound in the second sound digital signal based on the first sound digital signal and the second sound digital signal.

Steps S301-S303 are substantially the same as steps S201-S203 in FIG. 2.

S304: obtaining a third sound analog signal of a system sound, if a speaker of the robot outputs the system sound.

Since the robot itself will produce the system sound, for example, the robot will play music, tell stories, answer the user's questions and produce other voices interacting with the user, in order to avoid the influence of the robot's own voice on the recognition rate, the present disclosure also includes intercepting the analog signal of the voice output by the robot, that is, when it is detected that the robot outputs the signal of the system sound, the third sound analog signal output by the system is intercepted, in which the third sound analog signal is an analog signal before being output to the speaker.

In one embodiment, step S304 is implemented through the third sound signal obtaining unit of the device for improving speech interaction recognition rate of a robot, that is, the third sound signal obtaining unit is configured to obtain a third sound analog signal of a system sound, if a speaker of the robot outputs the system sound.

S305: converting the third sound analog signal into a third sound digital signal and performing a suppression process on the system sound in the second sound digital signal based on the third sound digital signal.

The third sound analog signal is converted to obtain the third sound digital signal, and a subtraction process is performed according to the second sound digital signal and the third sound digital signal, that is, the digital signal corresponding to the system sound contained in the second sound digital signal is removed, so that the sound signal left in the second sound digital signal can be more pure, and a higher recognition rate can be achieved in the subsequent speech recognition.

In one embodiment, step S305 is implemented through the second suppression unit of the device for improving speech interaction recognition rate of a robot, that is, the second suppression unit is configured to convert the third sound analog signal into a third sound digital signal and performing a suppression process on the system sound in the second sound digital signal based on the third sound digital signal.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 4:
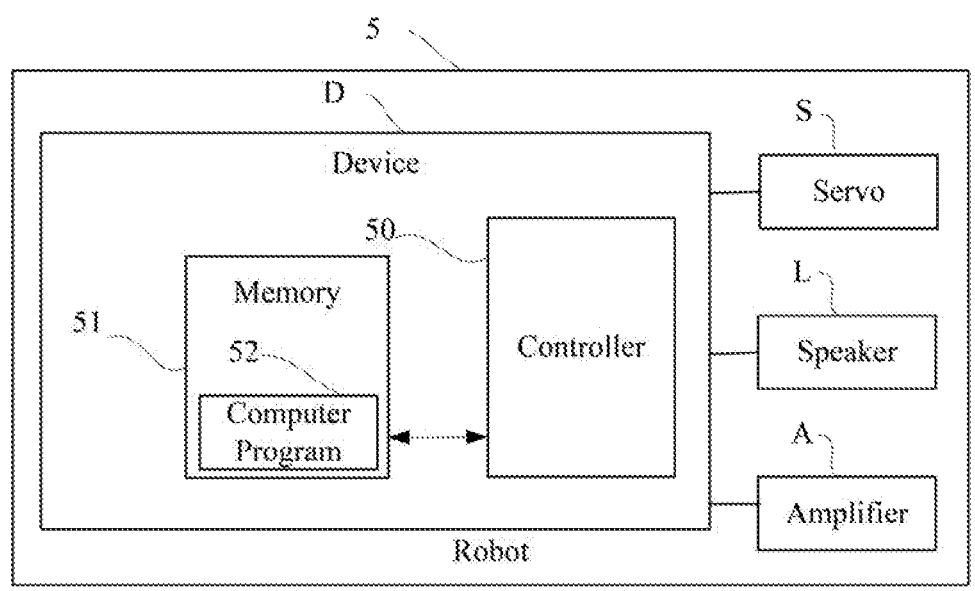
FIG. 4 is a schematic block diagram of an embodiment of a robot according to the present disclosure.

FIG. 4 is a schematic diagram of a robot according to an embodiment of the present disclosure. As shown in FIG. 4, the robot 5 of this embodiment includes a device D for improving speech interaction recognition rate of the robot 5, servo(s) S, a speaker L, and an amplifier A, in which the device D includes a main controller 50, a memory 51, and a computer program 52 stored in the memory 51 and executable on the main controller 50, for example, a program for improving speech interaction recognition rate of a robot. When executing (instructions in) the computer program 52, the main controller 50 implements the steps in the above-mentioned embodiments or implements the functions of each module/unit in the above-mentioned embodiments. In one embodiment, the computer program 52 includes a first sound signal obtaining unit for implementing step 201 shown in FIG. 2, a second sound signal obtaining unit for implementing step 202 shown in FIG. 2, a first suppression unit for implementing step 203 shown in FIG. 2, a third sound signal obtaining unit for implementing step 304 shown in FIG. 3, and a second suppression unit for implementing step 305 shown in FIG. 3. In other embodiments, a robot may include the circuit for improving speech interaction recognition rate of a robot shown in FIG. 1.

Exemplarily, the computer program 52 may be divided into one or more modules/units, and the one or more modules/units are stored in the storage 51 and executed by the main controller 50 to realize the present disclosure. The one or more modules/units may be a series of computer program instruction sections capable of performing a specific function, and the instruction sections are for describing the execution process of the computer program 52 in the robot 5. For example, computer program 52 can be divided into a first sound signal obtaining unit, a second sound signal obtaining unit, and a first suppression unit, and the specific functions of each unit are as follows:

the first sound signal obtaining unit is configured to obtain a pre-recorded servo sound file of a servo of the robot to decode into a first sound analog signal and convert the first sound analog signal into a first sound digital signal, in response to detecting the robot being in a motion state;

the second sound signal obtaining unit is configured to convert a second sound analog signal collected by a microphone into a second sound digital signal; and the first suppression unit is configured to perform a suppression process on a servo sound in the second sound digital signal based on the first sound digital signal and the second sound digital signal.

The robot 5 may include, but is not limited to, a main controller 50 and a storage 51. It can be understood by those skilled in the art that FIG. 4 is merely at example of the robot 5 and does not constitute a limitation on the robot 4, and may include more or fewer components than those shown in the figure, or a combination of some components for different components. For example, the robot 5 may further include an input/output device, a network access device, a bus, and the like.

The main controller 50 may be a central processing unit (CPU), or be other general purpose main controller, a digital signal main controller (DSP), an application specific integrated circuit (ASIC), a field-programmable gate array (FPGA), or be other programmable logic device, a discrete gate, a transistor logic device, and a discrete hardware component. The general purpose main controller may be a micro main controller, or the main controller may also be any conventional main controller.

The storage 51 may be an internal storage unit of the robot 5, for example, a hard disk or a memory of the robot 5. The storage 51 may also be an external storage device of the robot 5, for example, a plug-in hard disk, a smart media card (SMC), a secure digital (SD) card, flash card, and the like, which is equipped on the robot 5. Furthermore, the storage 51 may further include both an internal storage unit and an external storage device, of the robot 5. The storage 51 is configured to store the computer program and other programs and data required by the robot 5. The storage 51 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure, of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware (e.g., a circuit) or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a main controller. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A circuit for improving speech interaction recognition rate of a robot electrically connected to the circuit, comprising a first decoder, an analog-to-digital converter, a microphone, and a main controller, wherein:
   the main controller is configured to transmit a pre-recorded servo sound file to the first decoder in response to detecting the robot being in a motion state;
   the first decoder is configured to decode the servo sound the to obtain a first sound analog signal of a servo sound; and
   the analog-to-digital converter is configured to convert the first sound analog signal of the servo sound into a first sound digital signal, and convert a second sound analog signal collected by the microphone into a second sound digital signal;
   wherein, the main controller is further configured to perform a suppression process on the servo sound in the second sound digital signal based on the first sound digital signal and the second sound digital signal.

2. The circuit of claim 1, further comprising a second decoder and a speaker, wherein;
   the second decoder is configured to decode a system sound transmitted by the main controller to obtain a third sound analog signal of the system sound, transmit the third sound analog signal to the speaker, and transmit the third sound analog signal to the analog-to-digital converter; and
   the main controller is further configured to receive the third sound analog signal, and perform a suppression process on the system sound in the second sound analog signal.

3. The circuit of claim 2, further comprising an amplifier for amplifying the third sound analog signal output by the second decoder, wherein the amplifier outputs the second sound analog signal to drive the speaker.

4. A computer-implemented method for improving speech interaction recognition rate of a robot, comprising executing on a processor steps of:
   obtaining a pre-recorded servo sound file of a servo of the robot to decode into a first sound analog signal and convert the first sound analog signal into a first sound digital signal, in response to detecting the robot being in a motion state;
   converting a second sound analog signal collected by a microphone into a second sound digital signal; and
   performing a suppression process on a servo sound in the second sound digital signal based on the first sound digital signal and the second sound digital signal.

5. The method of claim 4, further comprising:
   obtaining a third sound analog signal of a system sound in response to a speaker of the robot outputting the system sound; and
   converting the third sound analog signal into a third sound digital signal and performing a suppression process on the system sound in the second sound digital signal based on the third sound digital signal.

6. The method of claim 5, wherein in the step of obtaining the third sound analog signal of the system sound, the third sound analog signal is an analog signal of the system sound amplified by an amplifier, and the third sound analog signal is output directly through the speaker of the robot.

7. A robot comprising:
   a device for improving speech interaction recognition rate of the robot; and
   a servo;
   wherein the device comprises:
      a first sound signal obtaining unit configured to obtain a pre-recorded servo sound file of the of the robot to decode into a first sound analog signal and convert the first sound analog signal into a first sound digital signal, in response to detecting the robot being in a motion state;
      a second sound signal obtaining unit configured to convert a second sound analog signal collected by a microphone into a second sound digital signal; and
      a first suppression unit configured to perform a suppression process on a servo sound in the second sound digital signal based on the first sound digital signal and the second sound digital signal.

8. The robot of claim 7, wherein the robot further comprises a speaker, and the device further comprising:
   a third sound signal obtaining unit configured to obtain a third sound analog signal of a system sound in response to the speaker outputting the system sound; and
   a second suppression unit configured to convert the third sound analog signal into a third sound digital signal and perform a suppression process on the system sound in the second sound digital signal based on the third sound digital signal.

9. The robot of claim 8, wherein the robot further comprises an amplifier, and in the third sound signal obtaining unit, the third sound analog signal is an analog signal of the system sound amplified by the amplifier, and the third sound analog signal is output directly through the speaker of the robot.

* * * * *